US007241559B2

(12) United States Patent
Borrelli et al.

(10) Patent No.: US 7,241,559 B2
(45) Date of Patent: Jul. 10, 2007

(54) LENS ARRAY AND METHOD FOR FABRICATING THE LENS ARRAY

(75) Inventors: Nicholas F. Borrelli, Elmira, NY (US); George B. Hares, Corning, NY (US); Pratima G. N. Rao, Sherwood, OR (US); Dennis W. Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 498 days.

(21) Appl. No.: 10/679,089

(22) Filed: Oct. 3, 2003

(65) Prior Publication Data

US 2004/0126698 A1    Jul. 1, 2004

Related U.S. Application Data

(60) Provisional application No. 60/416,076, filed on Oct. 4, 2002.

(51) Int. Cl.
  *G02B 1/00*    (2006.01)
(52) U.S. Cl. .................. 430/321; 430/330; 359/620
(58) Field of Classification Search ............. None
  See application file for complete search history.

(56) References Cited

U.S. PATENT DOCUMENTS

| | | | |
|---|---|---|---|
| 2,515,940 A | 7/1950 | Stookey | 49/92 |
| 2,628,160 A * | 2/1953 | Stookey | 216/87 |
| 4,186,999 A | 2/1980 | Harwood et al. | 350/96.21 |
| 4,518,222 A | 5/1985 | Borrelli et al. | 350/167 |
| 4,572,611 A * | 2/1986 | Bellman et al. | 399/218 |
| 4,609,259 A | 9/1986 | Suemitsu et al. | 350/417 |
| 4,727,047 A | 2/1988 | Bozler et al. | 437/89 |
| 4,737,447 A | 4/1988 | Suzuki et al. | 430/321 |
| 4,976,148 A | 12/1990 | Migliori et al. | 73/579 |
| 4,998,795 A | 3/1991 | Bowen et al. | 350/96.2 |
| 5,062,877 A | 11/1991 | Borrelli et al. | 65/30.13 |
| 5,074,649 A | 12/1991 | Hamanaka | 359/652 |
| 5,104,435 A | 4/1992 | Oikawa et al. | 65/30.13 |
| 5,126,863 A | 6/1992 | Otsuka et al. | 359/41 |
| 5,140,660 A | 8/1992 | Takahashi | 385/79 |
| 5,263,103 A | 11/1993 | Kosinski | 385/31 |
| 5,293,438 A | 3/1994 | Konno et al. | 385/35 |
| 5,337,186 A | 8/1994 | Oikawa et al. | 359/628 |
| 5,359,440 A | 10/1994 | Hamada et al. | 359/41 |

(Continued)

FOREIGN PATENT DOCUMENTS

EP    0 425 251    5/1991

(Continued)

*Primary Examiner*—John A. McPherson
(74) *Attorney, Agent, or Firm*—Timothy M. Schaeberle

(57) ABSTRACT

A lens array and a method for fabricating the lens array are described herein. The lens array is made from a photosensitive glass plate containing a relatively small amount of a photosensitive agent (e.g., silver, gold or combination thereof) such that when the photosensitive glass plate is subjected to an exposure step, a heat treatment step and an optional ion exchange step it becomes a glass composite plate that includes glass regions which are lenses and also includes an opaque opal region located around each of the lenses. The lens array has clear, colorless lenses exhibiting greater sag heights than those yellow lenses found in a traditional lens array made from the traditional photosensitive glass plate which was subjected to similar exposure, heat treatment and ion exchange steps.

14 Claims, 4 Drawing Sheets

U.S. PATENT DOCUMENTS

| | | | |
|---|---|---|---|
| 5,436,764 A | 7/1995 | Umetani et al. | 359/566 |
| 5,482,800 A | 1/1996 | Gal | 430/5 |
| 5,751,383 A | 5/1998 | Yamanaka | 349/13 |
| 2003/0031409 A1 | 2/2003 | Bellman et al. | 385/33 |

FOREIGN PATENT DOCUMENTS

| | | |
|---|---|---|
| EP | 0 615 150 | 9/1994 |
| JP | 63166736 | 9/1988 |
| WO | WO 98/33091 | 7/1998 |
| WO | WO 01/71403 | 9/2001 |
| WO | WO 02/10805 | 2/2002 |

* cited by examiner

LENS ARRAY AND METHOD FOR FABRICATING THE LENS ARRAY

CROSS REFERENCE TO RELATED APPLICATION

This application claims the benefit of priority to U.S. Ser. No. 60/416,076, filed Oct. 4, 2002, entitled Lens Array and Method for Fabricating the Lens Array, of Hares et al.

BACKGROUND OF THE INVENTION

1. Field of the Invention

The present invention relates in general to the photonics field and, in particular, to a lens array and a method for fabricating the lens array from a photosensitive glass plate that has a relatively small amount of a photosensitive agent (e.g., silver, gold or a combination thereof).

2. Description of Related Art

Today it is well known that a lens array can be made from a photosensitive glass plate. In fact, scientists at Corning Incorporated the, assignee of the present invention, have developed and patented a photosensitive glass plate known as FOTOFORM® glass and a process known as the SMILE® process which can be used to form a lens array. Detailed discussion relating to the SMILE® process is provided in U.S. Pat. Nos. 4,572,611, 4,518,222 and 5,062,877 the contents of which are incorporated herein by reference. While detailed discussion relating to FOTOFORM® glass is provided in U.S. Pat. Nos. 2,326,012, 2,422,472, 2,515,936, 2,515,938, 2,515,275, 2,515,942 and 2,515,943 the contents of which are incorporated herein by reference. An example of a traditional lens array that was fabricated from FOTOFORM® glass which was subjected to the SMILE® process is described below with respect to FIGS. 1A and 1B.

Referring to FIGS. 1A-1B, there are respectively illustrated a top view and side view of a 16×20 lens array 100 made from FOTOFORM® glass which was subjected to the SMILE® process. Basically, the SMILE® process subjects the FOTOFORM® glass to an ultraviolet light exposure step, a heat treatment step and if desired an ion exchange step to fabricate the traditional lens array 100. In particular, the traditional lens array 100 can be fabricated by exposing selected portions of the FOTOFORM® glass to ultraviolet light with wavelengths preferably between 240-400 nm (most preferable 300-350 nm) for approximately 3 minutes and then heat treating the exposed FOTOFORM® glass at 600° C. for 40 minutes. The traditional lens array 100 fabricated in this manner would have lenses 110 with a 5-15 μm sag height (see FIG. 1B). The traditional lens array 100 could also be subjected to an ion exchange treatment where the lens array 100 is immersed in a $KNO_3$ salt bath at 500° C. for 64 hours. The ion exchange treatment causes the lenses 110 to take on an undesirable yellow color but also causes the sag heights of the lenses 110 to increase to approximately 38-61 μm (see TABLE 1). Sag is the parameter that controls the radius of curvature and, as such, the focal lengths and light gathering powers of the developed lenses 110 through the following expression:

$$R_c = r_L^2/2\delta \quad (1)$$

where: $R_c$ is the lens radius of curvature.

$\delta$ is the sag.

$r_L$ is the lens radius.

Because, the color of the lenses 110 and the magnitude of the sag directly affects the performance of the lenses, scientists today are constantly trying to improve upon the composition of the photosensitive glass plate (FOTOFORM® glass) which is used to make a lens array. Accordingly, there is a need for a new composition of a photosensitive glass plate which can be used to make a lens array which has clear, colorless lenses exhibiting relatively large sag heights. This need and other needs are satisfied by the lens array and method of the present invention.

BRIEF DESCRIPTION OF THE INVENTION

The present invention includes a lens array made from a photosensitive glass plate containing a relatively small amount of a photosensitive agent (e.g., silver, gold or combination thereof) such that when the photosensitive glass plate is subjected to an exposure step, a heat treatment step and an optional ion exchange step it becomes a glass composite plate that includes glass regions which are lenses and also includes an opaque opal region located around each of the lenses. The lens array of the present invention has clear, colorless lenses with greater sag heights when compared to the yellow lenses in a traditional lens array that is made from the traditional photosensitive glass plate which was subjected to similar exposure, heat treatment and ion exchange steps. The present invention also includes a method for fabricating the lens array.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1A:
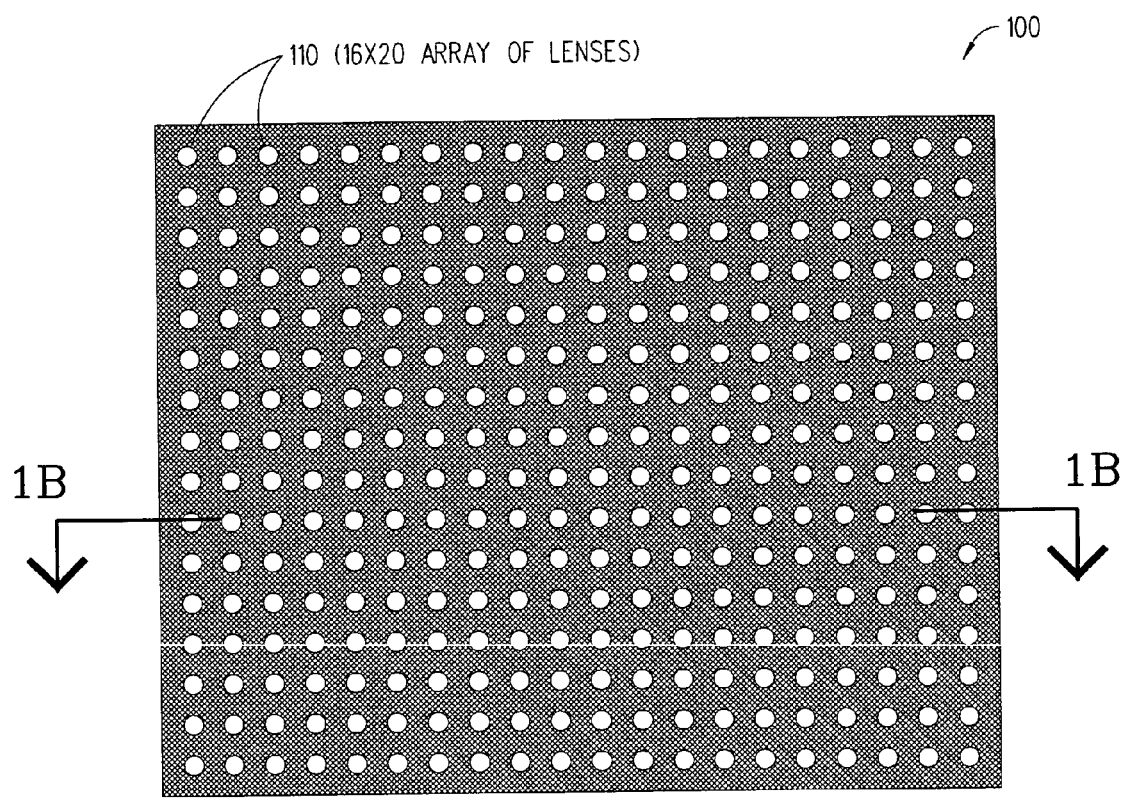
FIGS. 1A-1B (PRIOR ART) respectively illustrate a top view and side view of a traditional 16×20 lens array.
Figure 1B:
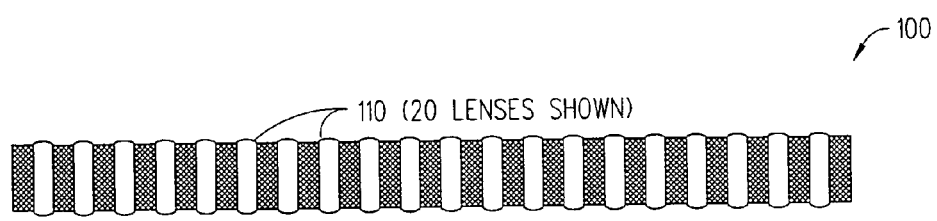
Figure 2:
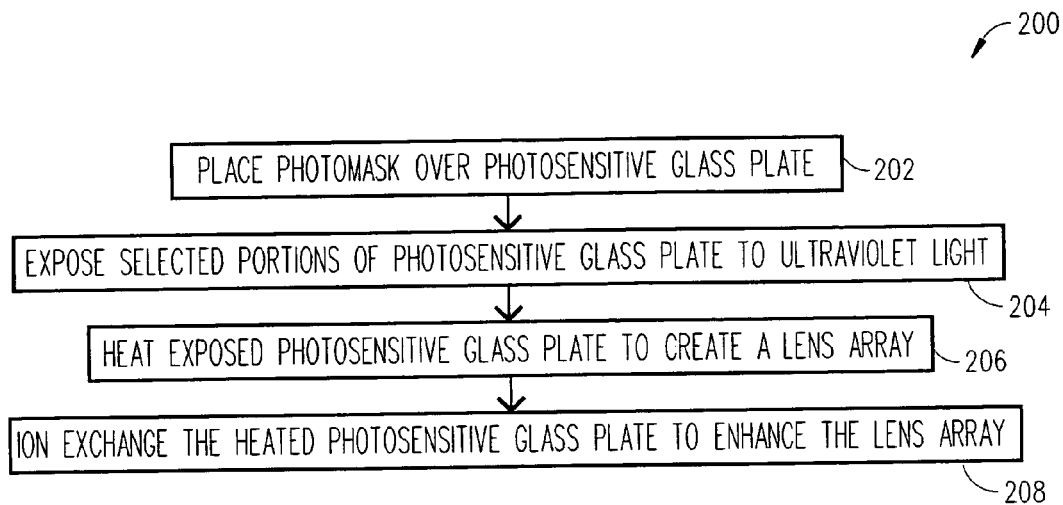
FIG. 2 is a flowchart illustrating the steps of a preferred method for fabricating a lens array in accordance with the present invention.

Referring to FIGS. 2-3, there are disclosed a lens array 300 and a preferred method 200 for fabricating the lens array 300 in accordance with the present invention. To better describe the present invention, detailed discussions about the lens array 300 and the preferred method 200 for fabricating the lens array 300 are provided before a detailed discussion about the different compositions of the photosensitive glass which can be used to make the lens array 300.

Referring to FIGS. 2 and 3A-3F, there are respectively illustrated a flowchart of the preferred method 200 for making the lens array 300 and various cross-sectional side views and top views of the lens array 300 at different steps in the preferred method 200. Beginning at step 202, a photomask 302 is placed in contact with a photosensitive glass plate 304 (see FIG. 3A). In the preferred embodiment, the photosensitive glass plate 304 is a photonucleable, crystallizable lithium-silicate glass plate that contains a predetermined amount of a photosensitive agent (e.g., silver, gold or a combination thereof). This preferred photosensitive glass plate 304 needs to be protected, at all stages prior to the heat treatment step 206, from ambient ultraviolet exposure (e.g., sunlight, unfiltered artificial light) to prevent trace amounts of opal formation in areas where lenses are desired in the lens array 300. Exemplary silicate glass compositions of the preferred photosensitive glass plate 304 are described in greater detail below with respect to TABLES 2 and 3A-3B.

The contact between the photomask 302 and the photosensitive glass plate 304 can be an air interface 303 where the feature spacing on the photomask 302 is relatively large, e.g., on the order of 10 μm or greater. An alternative to the air interface 303, is an index matching liquid (e.g., glycerin) which can be placed between the photomask 302 and the photosensitive glass plate 304. For example, one can use what is known as the glycerin-vacuum technique where a film of glycerin is placed between the photomask 302 and the photosensitive glass plate 304. The photosensitive glass plate 304 is then mounted on a vacuum fixture so an evacuation can draw the photomask 302 down onto the photosensitive glass plate 304 and squeeze out the excess glycerin to produce a continuous uniform glycerin film at the interface between the photomask 302 and the photosensitive glass plate 304.

Prior to step 202, the photosensitive glass plate 304 is ground and polished to make a suitably sized substrate for use as a lens array 300. Typical dimensions of the photosensitive glass plate 304 are 4"×4"×0.160". The length and width can be varied significantly depending on the application but the thickness preferably should not be less than about 0.075" or greater than about 0.25".

Figure 3A:
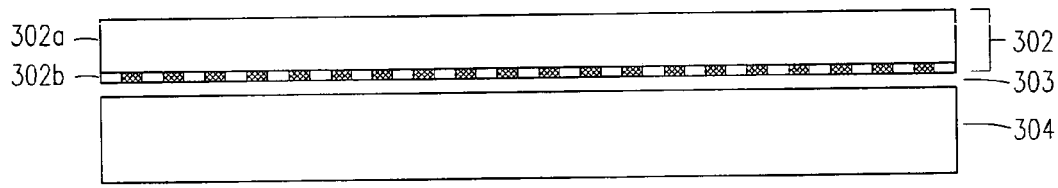
FIGS. 3A-3F illustrates cross-sectional side views and top views of the lens array at different steps in the method shown in FIG. 2.
Figure 3B:
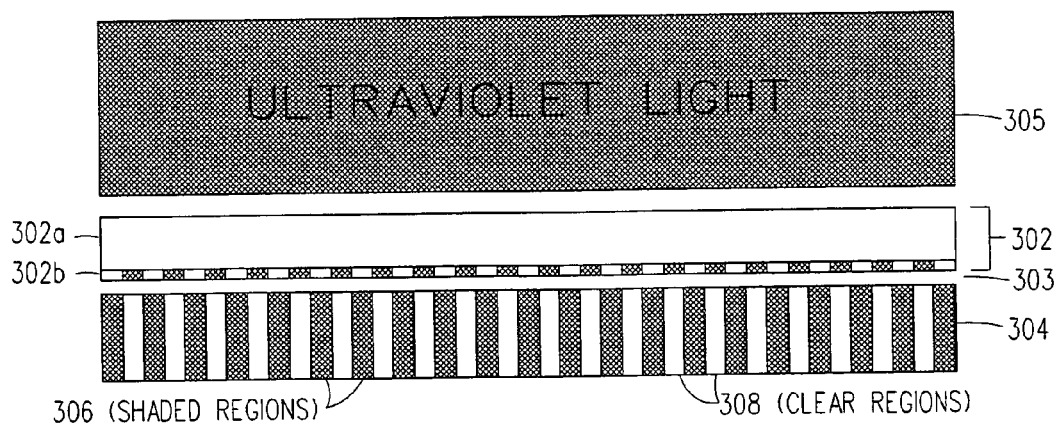

At step 204, the photomask 302 and selected regions of the photosensitive glass plate 304 are exposed to an ultraviolet light 305 (see FIG. 3B). In the preferred embodiment, the photomask is a chrome-on-quartz photomask 302 that is used to control the exposure pattern on the photosensitive glass plate 304. The chrome-on-quartz photomask 302 includes a quartz substrate 302a and a chromium layer 302b. The chrome in the chromium layer 302b of the photomask 302 is absent in those areas of the chromium layer that correspond to those desired opal regions 306 (shown as shaded regions) in the photosensitive glass plate 304. In particular, each opal region 306 is a composite of a glass phase and a lithium metasilicate nano-crystalline phase where the later is about 20% by volume of the composite. On the other hand, the chrome in the chromium layer 302b of the photomask 302 is present in those areas of the chromium layer that correspond to those desired glass regions 308 (shown as clear regions) in the photosensitive glass plate 304.

The exposure step 204 can be performed by any method that is capable of producing an ultraviolet light or shortwave radiation with sufficient energy to nucleate the opal regions (future opal regions 306 that do not transmit light) in the photosensitive glass plate 304 and with sufficient collimation so that the exposure is well defined through the photosensitive glass plate 304. For example, a collimated 1000 watt Hg/Xe arc source can be used to expose the photosensitive glass plate 304. In this example, the output beam is approximately 10" in diameter which is more than sufficient for a 5"×5" photomask 302. The intensity of the ultraviolet light is in the 5-10 mw/cm² range with exposure times of 3-4 minutes. Other ultraviolet sources besides the Hg/Xe source can also be used including, for example, excimer lasers (309-350 nm), tunable YAG 300-400 nm. After the exposure step 204, the photomask 302 is separated from the exposed photosensitive glass plate 304 and if needed the exposed photosensitive glass plate 304 is washed with soap and water to remove the glycerin prior to the heat treatment step 206.

Figure 3C:
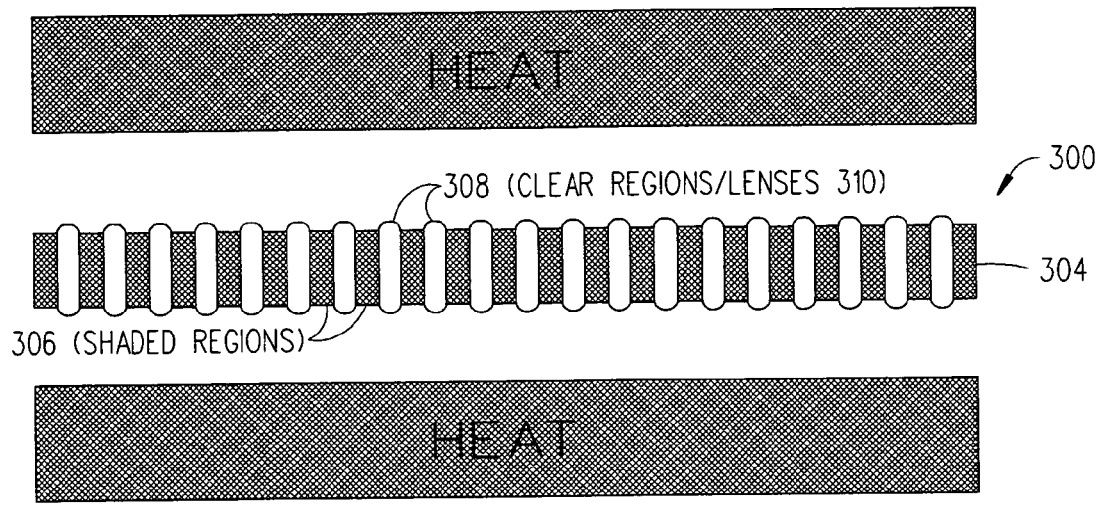
Figure 3D:
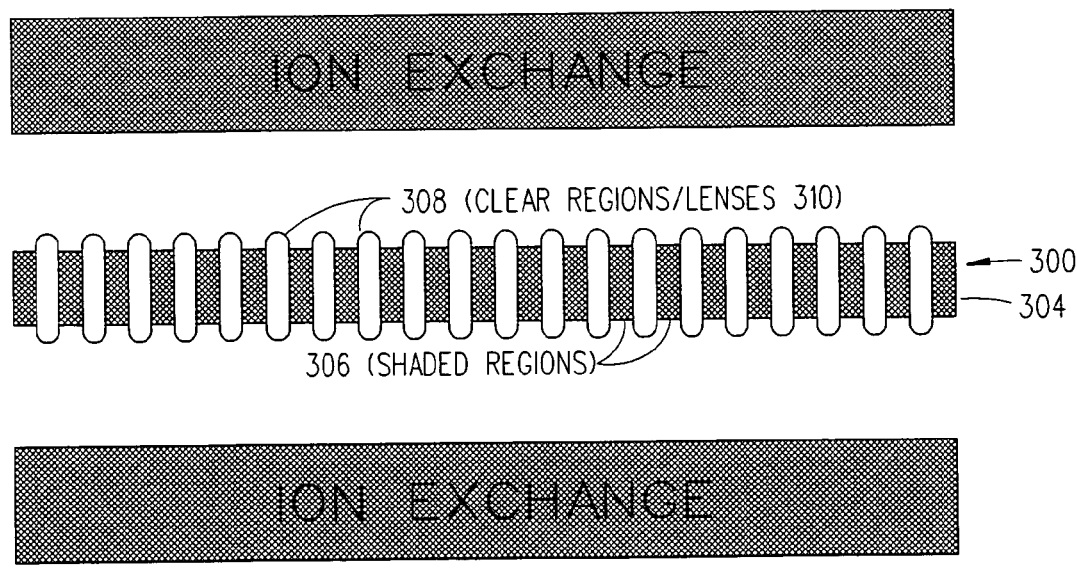
Figure 3E:
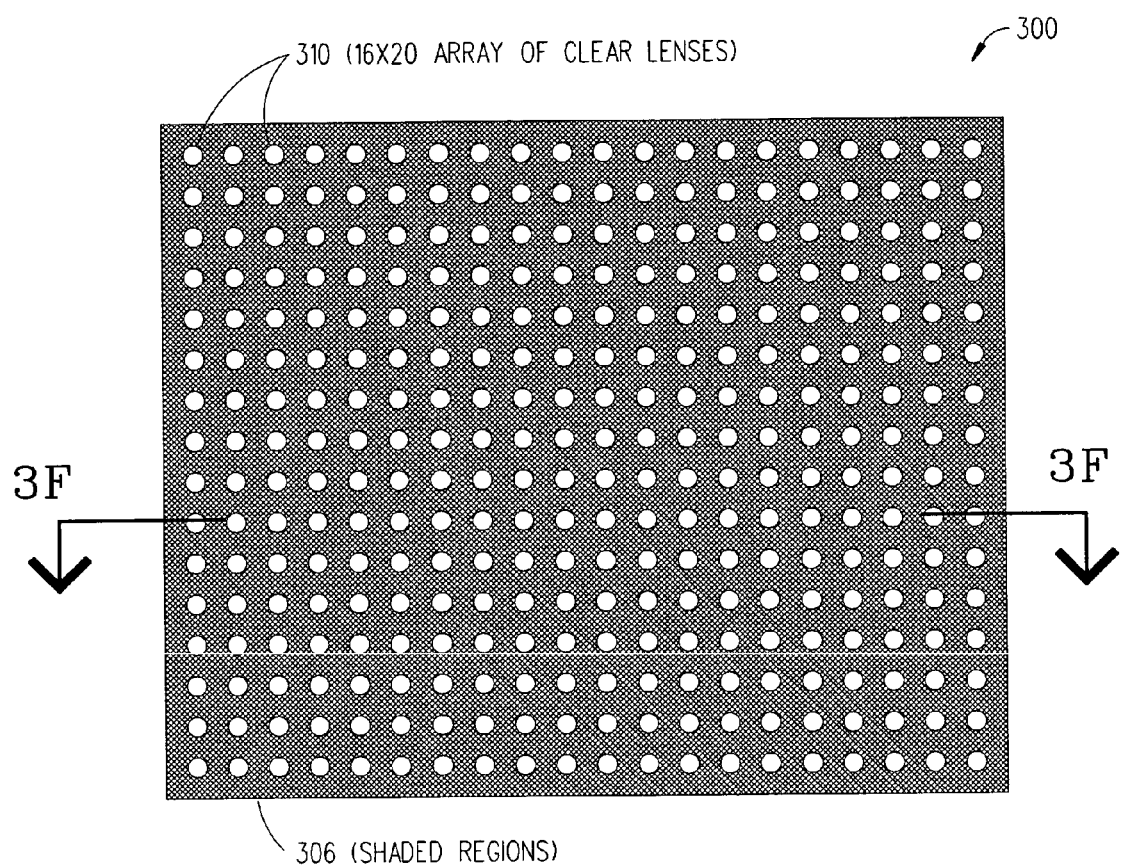
Figure 3F:
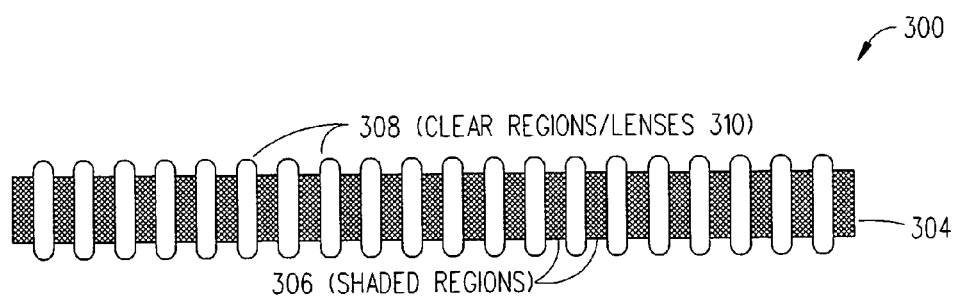

At step 206, the exposed photosensitive glass plate 304 is heated to form therein the opal regions 306 (shown as shaded regions) and the glass regions 308 (shown as clear regions) (see FIG. 3C). In the preferred embodiment, the heat treatment step 206 is performed in a furnace with the exposed photosensitive glass plate 304 placed in a covered stainless steel box; the furnace atmosphere comprises flowing dry nitrogen. In particular, the exposed photosensitive glass plate 304 is placed on a former or flat plate with the exposed face of the exposed photosensitive glass plate 304 facing up. The former can be any glass, ceramic or glass-ceramic material to which the exposed photosensitive glass plate 304 will not fuse to during the heat treatment step 206 and which does not deform during the heat treatment step 206. Powdered $Al_2O_3$ (for example) can be spread on the former to act as a parting agent. A typical heat treat schedule is as follows:

460° C./hr to 480° C.
150° C./hr to 615° C.
Hold@ 615° C. for 60 minutes.
Cool furnace rate.

During the heating step 206, the opal regions 306 shrink considerably more than the glass regions 308 in the photosensitive glass plate 304 (see FIG. 3C). After completing steps 202, 204 and 206, the heated photosensitive glass plate 304 is transformed into a thermally produced lens array 200 which is basically a glass composite plate 304 (see FIG. 3C).

In a preferred embodiment, the lens array 300 can be produced by exposing the photosensitive glass plate 304 to ultraviolet light with wavelengths preferably between 240-400 nm (most preferable 300-350 nm) and subsequently heat treating the exposed photosensitive glass plate 304 at 615° C. for 1 hour to form the opal regions 306 and the glass regions 308.

The opal regions 306 have crystalline particles and as such they have a greater density than the glass regions 308. The mechanism for formation of nuclei that enables the growth of the crystalline particles in the opal regions 306 starts when cerium III ($Ce^{3+}$) in the photosensitive glass plate 304 absorbs the ultraviolet light and converts to cerium IV ($Ce^{4+}$) which results in the release of an electron. The electron is absorbed by metal ions, for example silver ions ($Ag^{1+}$), in the photosensitive glass plate 304 and converts these ions to metal (e.g., $Ag°$).

The thermally produced lens array 300 fabricated in this manner have lenses 310 shown as glass regions 308 that exhibit sag heights that are greater than those sag heights exhibited by the lenses 110 in the traditional lens array 100 (compare FIG. 1B to FIG. 3C). As a result of the greater sag heights exhibited by the present lens array 300 these lenses 310 exhibit a smaller mode field diameter and a shorter distance beam to waist. Thus, one can make a smaller lens array 300 which results in more lenses 310 per unit area of glass which, in turn, translates into cost savings.

The improvement in the sag heights of the lenses 310 is a direct result of the improved silicate glass compositions/ photosensitive glass plate 304, developed by the inventors, which is used to make the lens array 300 (see TABLES 2 and 3A-3B).

Referring again to FIGS. 2 and 3D-3F, at step 208 (optional), the thermally produced lens array 300 can be subjected to an ion exchange process to create an enhanced lens array 300 (see FIG. 3D). Basically, the prolonged ion exchange step 208 is used to further increase the sag heights of the lenses 310 in the lens array 300. In the preferred embodiment, the prolonged ion exchange step 210 could be completed by immersing the thermally produced lens array 300 into a $KNO_3$ molten salt bath at 500° C. for 64 hours. The lens array 300, that is subjected to the ion exchange step 208, exhibits lenses 310 with sag heights that are even greater than the sag heights of lenses 310 in the thermally produced lens array 300 (compare FIG. 3C to FIG. 3D).

It should be noted again that in the prior art after completing steps 202, 204, 206 and the prolonged ion exchange step 208, it was only possible to produce traditional lens array 100 which possessed lenses 110 exhibiting a yellow color. The yellow color of the lenses 110 is an undesirable property that adversely affects the transmittance of the lenses 110. The inventors believe that the large amount of photosensitive agent (e.g., silver) causes the lenses 110 in the traditional lens array 100 to turn yellow when the lens array 100 is subjected to a prolonged ion exchange step. In particular, the inventors believe that the lenses 110 become yellow because the prolonged heat in the ion exchange step causes a reduction of silver in the lenses 110 (unexposed glass regions).

Thus after completing steps 202, 204, 206 and 208 in accordance with the present invention, it is possible to produce a lens array 300 that has an M×N array of clear, colorless lenses 310 (e.g., bi-convex lenses, plano-convex lenses, equi-convex) with greater sag heights than the yellow lenses 110 in the traditional lens array 100 that was made in the same manner. This is because the photosensitive glass plate 304 used to make the lens array 300 has a different silicate glass composition than the photosensitive glass plate used to make the traditional lens array 100. The differences between the new and old photosensitive glass plates are described in greater detail below with respect to TABLES 1, 2 and 3A-3B.

As described above, the traditional lens array 100 is made from a photosensitive glass plate known as FOTOFORM® glass. Table 1 shows the composition in parts by weight of FOTOFORM® glass, in addition to measured sag heights and various physical properties:

TABLE 1

| | FOTOFORM ® glass |
|---|---|
| $SiO_2$ | 79.3 |
| $Na_2O$ | 1.6 |
| $K_2O$ | 3.3 |
| $KNO_3$ | .9 |
| $Al_2O_3$ | 4.2 |
| ZnO | 1.0 |
| Au | .0012 |
| Ag | .115 |
| $CeO_2$ | .015 |
| $Sb_2O_3$ | .4 |
| $Li_2O$ | 9.4 |
| SAG HEIGHTS: | |
| sag height (1 minute exposure to Hg/Xe radiation) | 5 μm |
| sag height (2 minute exposure to Hg/Xe radiation) | 14 μm |
| sag height (1 minute exposure to Hg/Xe radiation and ion exchange step) | 38 μm |
| sag height (2 minute exposure to Hg/Xe radiation and ion exchange step) | 61 μm |
| PHYSICAL PROPERTIES | |
| Softening Point | Crystallized During Measurement |
| Annealing Point | 454° C. |
| Strain Point | 416° C. |
| Coefficient of Thermal Expansion (CTE) | 83° C. |
| Density | 2.308 |

As can be seen in TABLE 1, the FOTOFORM® glass uses a relatively large amount of silver and minor amounts of gold as the photosensitive agents. The inventors of the present invention have conducted experiments and determined that lens arrays 300 can be produced having clear, colorless lenses 310 and exhibiting enhanced sag heights, if the lens array 300 is made from a photosensitive glass plate 304 that uses a relatively small amount of a photosensitive agent (e.g., silver, gold or a combination thereof). As such, the inventors have developed different silicate glass compositions of a photosensitive glass plate 304 which can be subjected to the aforementioned steps 202, 204, 206 and 208 or similar steps and still form a lens array 300 that exhibits clear, colorless lenses 310 having enhanced sag heights (see TABLES 2 and 3A-3B).

TABLE 2 reports the inventive glass composition for use in forming the inventive photosensitive glass plate 304, with the various constituents listed in weight percent wt %:

TABLE 2

| | photosensitive glass plate 304 |
|---|---|
| $SiO_2$ | 65-85 |
| $Na_2O$ | 0-10 |
| $K_2O$ | 0-8 |
| $KNO_3$ | 0-5 |
| $Al_2O_3$ | 2-7 |
| ZnO | 0-5 |
| $Sb_2O_3$ | 0-5 |
| $CeO_2$ | 0.01-0.05 |
| $Li_2O$ | 8-11 |
| Au | 0-0.015* |
| Ag | 0-0.005** |

*If Au is zero, then Ag is the sole photosenstive agent with a 0.0005-0.005 weight percent wt %.
**If Ag is zero, then Au is the sole photosenstive agent with a 0.005-0.015 weight percent wt %.

Tables 3A-3B list exemplary silicate glass compositions within the aforementioned inventive range for a photosensitive glass plate 304 which can be used to make the lens array 300. Tables 3A-3B shows each of the compositions in parts by weight of the silicate glass, in addition to measured sag heights and various physical properties:

TABLE 3A

| | 1 | 2 | 3 | 4 | 5 | 6 | 7 |
|---|---|---|---|---|---|---|---|
| $SiO_2$ | 76.7 | 75.7 | 74.7 | 73.7 | 72.7 | 79.5 | 76.7 |
| $Na_2O$ | 4 | 5 | 6 | 7 | 8 | 1.6 | 2 |
| $K_2O$ | 3.8 | 3.8 | 3.8 | 3.8 | 3.8 | 4.2 | 5.8 |
| $KNO_3$ | 0 | 0 | 0 | 0 | 0 | 0 | 0 |
| $Al_2O_3$ | 4.8 | 4.8 | 4.8 | 4.8 | 4.8 | 4.2 | 4.8 |
| ZnO | 1 | 1 | 1 | 1 | 1 | 1 | 1 |
| Au | 0 | 0 | 0 | 0 | 0 | 0 | 0 |
| Ag | .0025 | .0025 | .0025 | .0025 | .0025 | .0025 | .0025 |
| $CeO_2$ | 0.02 | 0.02 | 0.02 | 0.02 | 0.02 | 0.02 | 0.02 |
| $Sb_2O_3$ | 0 | 0 | 0 | 0 | 0 | 0 | 0 |
| $Li_2O$ | 9.7 | 9.7 | 9.7 | 9.7 | 9.7 | 9.5 | 9.7 |
| SAG HEIGHTS: | | | | | | | |
| sag height (4 minute exposure to Hg/Xe radiation) | 43 µm | 47 µm | 47 µm | 68 µm | 71 µm | 17 µm | 36.8 µm |
| sag height (8 minute exposure to Hg/Xe radiation) | 35 µm | 52 µm | 37 µm | 69 µm | 89 µm | 27 µm | 45.1 µm |
| sag height (4 minute exposure to Hg/Xe radiation and ion exchange step) | 100 µm | 106 µm | 105 µm | 125 µm | 154 µm | 53 µm | 86.6 µm |
| sag height (8 minute exposure to Hg/Xe radiation and ion exchange step) | 89 µm | 111 µm | 90 µm | 130 µm | 187 µm | 62 µm | 77.8 µm |
| PHYSICAL PROPERTIES | | | | | | | |
| Softening Point | 617° C. | 602° C. | 596° C. | 586° C. | 578° C. | NA | NA |
| Annealing Point | 441° C. | 436° C. | 432° C. | 429° C. | 431° C. | NA | NA |
| Strain Point | 403° C. | 400° C. | 396° C. | 397° C. | 415° C. | NA | NA |
| Coefficient of Thermal Expansion (CTE) | 93.0° C. | 97.2° C. | 100° C. | 104.9° C. | 109.1° C. | NA | NA |
| Density (g/cm³) | 2.380 | 2.392 | 2.398 | 2.406 | 2.415 | NA | NA |

TABLE 3B

| | 8 | 9 | 10 | 11 | 12 | 13 |
|---|---|---|---|---|---|---|
| $SiO_2$ | 74.7 | 78.7 | 74.7 | 76.7 | 76.7 | 76.7 |
| $Na_2O$ | 9.8 | 4 | 4 | 0 | 4 | 2 |
| $K_2O$ | 0 | 3.8 | 3.8 | 6.8 | 2.8 | 4.8 |
| $KNO_3$ | 0 | 0 | 0 | 1 | 1 | 1 |
| $Al_2O_3$ | 4.8 | 2.8 | 6.8 | 4.8 | 4.8 | 4.8 |
| ZnO | 1 | 1 | 1 | 1 | 1 | 1 |
| Au | 0 | 0 | 0 | .01 | 0 | .01 |
| Ag | .0025 | .0025 | .0025 | 0 | .0025 | 0 |
| $CeO_2$ | 0.02 | 0.02 | 0.02 | 0.02 | 0.02 | 0.02 |
| $Sb_2O_3$ | 0 | 0 | 0 | .2 | .2 | .2 |
| $Li_2O$ | 9.7 | 9.7 | 9.7 | 9.7 | 9.7 | 9.7 |
| SAG HEIGHTS: | | | | | | |
| sag height (4 minute exposure to Hg/Xe radiation) | 32.6 µm | 30.5 µm | 29.6 µm | 23.6 µm* | 27.0 µm | 31.9 µm* |
| sag height (8 minute exposure to Hg/Xe radiation) | 36.8 µm | 23.8 µm | 40.2 µm | 22.0 µm** | 22.0 µm | 79.5 µm** |
| sag height (4 minute exposure to Hg/Xe radiation and ion exchange step) | 87.7 µm | 86.3 µm | 80.2 µm | 55.2 µm* | 50.5 µm | 48.6 µm* |
| sag height (8 minute exposure to Hg/Xe radiation and ion exchange step) | 97.4 µm | 78.0 µm | 92.5 µm | 46.2 µm** | 46.2 µm | 113.7 µm** |
| PHYSICAL PROPERTIES | | | | | | |
| Softening Point | 585° C. | | | | | |
| Annealing Point | 429° C. | | | | | |

TABLE 3B-continued

|  | 8 | 9 | 10 | 11 | 12 | 13 |
|---|---|---|---|---|---|---|
| Strain Point | 394° C. | | | | | |
| Coefficient of Thermal Expansion (CTE) | 104.9° C. | | | | | |
| Density (g/cm³) | 2.408 | | | | | |

*3 minute exposure to Hg/Xe radiation and heat treated at 615° C. for 1 hr in $N_2$.
**6 minute exposure to Hg/Xe radiation and heat treated at 615° C. for 1 hr in $N_2$.

The silicate glass compositions listed in TABLES 3A-3B have been used to make a number of lens arrays 300 which have clear, colorless lenses 310 with enhanced sag heights. Even though the sag heights of the lenses 310 appears to be a function of the soda content shown in TABLES 3A-3B, it is believed that the increased sag heights is attributable to the decreasing viscosity of the glass plate at 500° C.

In addition to the aforementioned silicate glass compositions listed in TABLES 2 and 3A-3B, it should be understood that there may be other photosensitized silicate glass compositions which have yet to be developed but could be used to make desirable lens arrays 300. It should also be understood that the preferred steps 202, 204, 206 and 208 can be changed in a number of ways and that different silicate glass compositions of photosensitive glass plate 304 can be used to make desirable lens arrays 300 which have an M×N array of relatively clear lenses 310.

It should be understood that a consequence of using the photosensitive glass plate 304 of the present invention is that the exposed and thermally developed opal regions 306 (opal regions) are generally white in color rather than the typical blue-brown in the FOTOFORM® glass. It should also be understood that another consequence of using the photosensitive glass plate 304 of the present invention is that biconvex lenses can be made which have a superior surface quality when compared to the biconvex lenses made using the FOTOFORM® glass.

It should also be understood that the lens array 300 can be coupled to a fiber array to form a collimator array that can be used to perform a variety of signal processing operations including multiplexing, switching, filtering, polarizing and demultiplexing. Following is a brief list of some of the photonic applications that can use a collimator array:

Laser diode arrays.
Optical Interconnects.
Contact image sensors.
Light emitting diode arrays.
Liquid crystal display projection systems.
Charge coupled device with a direct mounted lens array.
2-D and 3-D optical switches.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A lens array, comprising:
a photosensitive glass plate having a silicate glass composition with at least the following elements:
$SiO_2$ (65-85 wt %)
$Li_2O$ (8-11 wt %)
$Al_2O_3$ (2-7 wt %)
$CeO_2$ (0.01-0.05 wt %) and including a photosensitive agent comprising:
Ag (0.0005-0.005 wt %)
wherein when the photosensitive glass plate is subjected to an exposure step, an approximately 615° C. heat treatment step and a prolonged ion exchange step it becomes a glass composite plate that includes a plurality of glass regions which are lenses and at least one opal region located around the lenses.

2. The lens array of claim 1, wherein said glass composite plate has substantially clear, colorless lenses.

3. The lens array of claim 1, wherein said glass composite plate has lenses formed therein which have sag heights that are 46.2 µm-187 µm.

4. The lens array of claim 1, wherein said prolonged ion exchange step is used to increase the sag height of the lenses by immersing the glass composite plate into a $KNO_3$ molten salt bath at 500° C. for times on the order of 64 hours.

5. The lens array of claim 1, wherein said silicate glass composition of said photosensitive glass plate also has the following elements:
$Na_2O$ (0-10 wt %)
$K_2O$ (0-8 wt %)
ZnO (0-5 wt %)
$Sb_2O_3$ (0-5 wt %); and
$KNO_3$ (0-5 wt %).

6. The lens array of claim 1, wherein said photosensitive agent is comprised of a combination of said Ag (0.0005-0.005 wt %) and Au (0.005-0.015 wt %).

7. A method for making a lens array, said method comprising the steps of:
placing a photomask over a non-exposed photosensitive glass plate having a silicate glass composition with at least the following elements:
$SiO_2$ (65-85 wt %)
$Li_2O$ (8-11 wt %)
$Al_2O_3$ (2-7 wt %)
$CeO_2$ (0.01-0.05 wt %)
and including an amount of a photosensitive agent comprising:
Ag (0.0005-0.005 wt %);
exposing the photomask and selected regions in the non-exposed photosensitive glass plate to an ultraviolet light;
heating the exposed photosensitive glass plate to about 615° C. to form therein a plurality of glass regions and at least one opal region; and
ion exchanging the heated photosensitive glass plate to create said lens array, wherein said lens array is a glass composite plate where the plurality of glass regions are lenses and the at least one opal region is located around the lenses.

8. The method of claim 7, wherein said lens array has substantially clear, colorless lenses.

9. The method of claim 7, wherein said lens array has lenses formed therein which have sag heights that are 46.2 µm-187 µm.

10. The method of claim 7, wherein said ion exchange step is used to increase the sag height of the lenses by immersing the glass composite plate into a $KNO_3$ molten salt bath at 500° C. for times on the order of 64 hours.

11. The method of claim 7, wherein said silicate glass composition of said photosensitive glass plate also has the following elements:
$Na_2O$ (0-10 wt %)
$K_2O$ (0-8 wt %)
ZnO (0-5 wt %)
$Sb_2O_3$ (0-5 wt %); and
$KnO_3$ (0-5 wt %).

12. The method of claim 7, wherein said photosensitive agent is comprised of a combination of said Ag (0.0005-0.005 wt %) and Au (0.005-0.015 wt %).

13. A lens array, comprising:
a photosensitive glass plate having a silicate glass composition with at least the following elements:
$SiO_2$ (65-85 wt %)
$Li_2O$ (8-11 wt %)
$Al_2O_3$ (2-7 wt %)
$CeO_2$ (0.01-0.05 wt %) and including a photosensitive agent comprising:
Au (0.005-0.015 wt %)
wherein when the photosensitive glass plate is subjected to an exposure step, an approximately 615° C. heat treatment step and a prolonged ion exchange step it becomes a glass composite plate that includes a plurality of glass regions which are lenses and at least one opal region located around the lenses.

14. A method for making a lens array, said method comprising the steps of:
placing a photomask over a non-exposed photosensitive glass plate having a silicate glass composition with at least the following elements:
$SiO_2$ (65-85 wt %)
$Li_2O$ (8-11 wt %)
$Al_2O_3$ (2-7 wt %)
$CeO_2$ (0.01-0.05 wt %)
and including an amount of a photosensitive agent comprising:
Au (0.005-0.015 wt %);
exposing the photomask and selected regions in the non-exposed photosensitive glass plate to an ultraviolet light;
heating the exposed photosensitive glass plate to about 615° C. to form therein a plurality of glass regions and at least one opal region; and
ion exchanging the heated photosensitive glass plate to create said lens array, wherein said lens array is a glass composite plate where the plurality of glass regions are lenses and the at least one opal region is located around the lenses.

* * * * *